US008988463B2

(12) United States Patent
Stone Perez et al.

(10) Patent No.: US 8,988,463 B2
(45) Date of Patent: Mar. 24, 2015

(54) SYMPATHETIC OPTIC ADAPTATION FOR SEE-THROUGH DISPLAY

(75) Inventors: Kathryn Stone Perez, Kirkland, WA (US); Alex Aben-Athar Kipman, Redmond, WA (US); Andrew Fuller, Redmond, WA (US); Philip Greenhalgh, East Sussex (GB); David Hayes, East Sussex (GB); John Tardif, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 769 days.

(21) Appl. No.: 12/963,547

(22) Filed: Dec. 8, 2010

(65) Prior Publication Data

US 2012/0147038 A1 Jun. 14, 2012

(51) Int. Cl.
| | | |
|---|---|---|
| G09G 5/00 | (2006.01) | |
| G02B 27/01 | (2006.01) | |
| G06T 19/00 | (2011.01) | |
| G09G 5/377 | (2006.01) | |
| G02B 23/12 | (2006.01) | |

(52) U.S. Cl.
CPC ........... *G02B 27/0172* (2013.01); *G06T 19/006* (2013.01); *G09G 5/377* (2013.01); *G02B 2027/0132* (2013.01); *G02B 27/017* (2013.01); *G02B 27/01* (2013.01); *G02B 23/125* (2013.01); *G02B 2027/0127* (2013.01); *G02B 2027/0178* (2013.01); *G02B 2027/0187* (2013.01)
USPC ........... 345/632; 345/629; 345/633; 345/634; 345/8; 42/119; 42/122; 359/630; 359/480

(58) Field of Classification Search
CPC .............................. G06T 19/006; G09G 5/377
USPC ............... 345/632–634, 8, 629; 359/480, 630
See application file for complete search history.

(56) References Cited

U.S. PATENT DOCUMENTS 5,671,089 A * 9/1997 Allio ............................ 359/462
7,403,337 B2   7/2008 Ou
(Continued)

FOREIGN PATENT DOCUMENTS

CN        1664649 A    9/2005
CN     101029968 A    9/2007
(Continued)

OTHER PUBLICATIONS

"International Search Report", Mailed Date: Apr. 30, 2012, Application No. PCT/US2011/062433, Filed Date: Nov. 29, 2011, pp. 9.
Liu, Sheng et al., "A Novel Prototype for an Optical See-Through Head-Mounted Display with Adressable Focus Cues," IEEE Transactions on Visualization and Computer Graphics, vol. 16, No. 13, May/Jun. 2010, Published by the IEEE Computer Society, 13 pages.
(Continued)

*Primary Examiner* — Jin-Cheng Wang
(74) *Attorney, Agent, or Firm* — Jeremy Snodgrass; Judy Yee; Micky Minhas

(57) ABSTRACT

A method for overlaying first and second images in a common focal plane of a viewer comprises forming the first image and guiding the first and second images along an axis to a pupil of the viewer. The method further comprises adjustably diverging the first and second images at an adaptive diverging optic to bring the first image into focus at the common focal plane, and, adjustably converging the second image at an adaptive converging optic to bring the second image into focus at the common focal plane.

17 Claims, 3 Drawing Sheets

(56) References Cited

U.S. PATENT DOCUMENTS

| | | | |
|---|---|---|---|
| 2006/0104180 A1* | 5/2006 | Mori et al. | 369/94 |
| 2006/0250322 A1 | 11/2006 | Hall et al. | |
| 2007/0008624 A1 | 1/2007 | Hirayama | |
| 2008/0117289 A1* | 5/2008 | Schowengerdt et al. | 348/46 |
| 2009/0005961 A1* | 1/2009 | Grabowski et al. | 701/200 |
| 2009/0128919 A1 | 5/2009 | Kim | |
| 2010/0045783 A1 | 2/2010 | State et al. | |
| 2010/0079356 A1 | 4/2010 | Hoellwarth | |
| 2011/0271576 A1* | 11/2011 | Jahromi | 42/122 |

FOREIGN PATENT DOCUMENTS

| | | |
|---|---|---|
| CN | 101285935 A | 10/2008 |
| CN | 101655605 A | 2/2010 |
| CN | 101726857 A | 6/2010 |
| JP | 09-211374 A | 8/1997 |
| JP | 2002-116409 A | 4/2002 |
| WO | 2006017771 A1 | 2/2006 |

OTHER PUBLICATIONS

Tuceryan, Mihran et al., "Single point active alignment method (SPAAM) for optical see-through HMD calibration for augmented reality," Presence: Teleoperators and Virtual Environments, vol. 11, Issue 3, pp. 259-276, Jun. 2002, published by MIT Press, 32 pages.

Kuhl, Scott A. et al., "HMD calibration and its effects on distance judgements," ACM Transactions on Applied Perception, 6(3), Aug. 2009, <http://doi.acm.org/10.1145/1577755.1577762>, 24 pages.

Fischer, Robert E. et al., "Methods for Improving Depth Perception in HMDs," Paper presented at the RTO HFM Workshop on "The Capability of Virtual Reality to Meet Military Requirements" held in Orlando, Florida, USA, Dec. 5-9, 1997, 8 pages.

State Intellectual Property Office of the People's Republic of China, Office Action and Search Report Issued in CN201110430502.4, Dec. 30, 2013, 10 Pages.

* cited by examiner

SYMPATHETIC OPTIC ADAPTATION FOR SEE-THROUGH DISPLAY

BACKGROUND

A see-through display merges a display image and an external image, presenting both images in the same physical space. Such a display may be used in a wearable, head-mounted display system; it may be coupled in goggles, a helmet, or other eyewear. The see-through display enables the viewer to view images from a computer, video game, media player, or other electronic device, with privacy and mobility. When configured to present two different display images, one for each eye, this approach may be used for stereoscopic (e.g., virtual-reality) display.

To provide a positive viewing experience, a head-mounted display system may be configured in view of certain ocular relationships. One such relationship is the placement of the focal plane of the display image relative to a background subject in the external scene. If the focal plane of the display image is too far from the background subject, the viewer may have difficulty focusing and may experience eyestrain.

SUMMARY

One embodiment of this disclosure provides a method for overlaying first and second images in a common focal plane of a viewer. The method comprises forming the first image and guiding the first and second images along an axis to a pupil of the viewer. The method further comprises adjustably diverging the first and second images at an adaptive diverging optic to bring the first image into focus at the common focal plane, and, adjustably converging the second image at an adaptive converging optic to bring the second image into focus at the common focal plane.

The summary above is provided to introduce a selected part of this disclosure in simplified form, not to identify key or essential features. The claimed subject matter, defined by the claims, is limited neither to the content of this summary nor to implementations that address problems or disadvantages noted herein.

DETAILED DESCRIPTION

Figure 2:
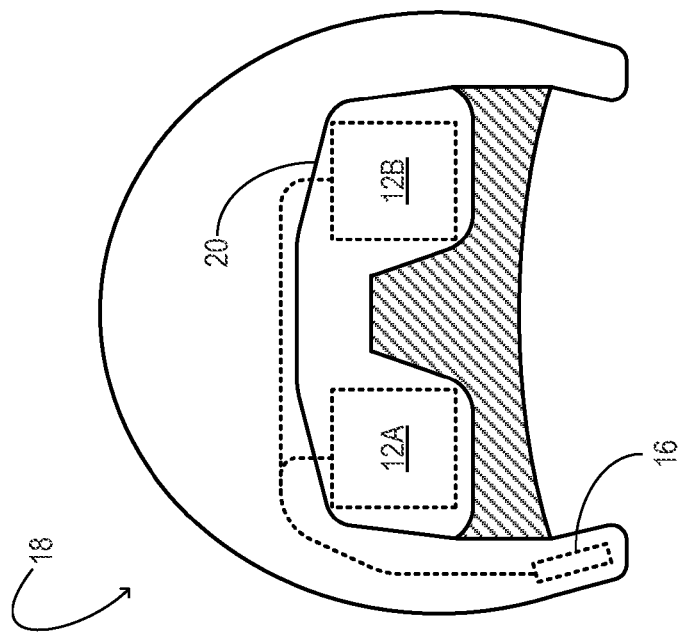
FIGS. 1 and 2 show example head-mounted display systems in accordance with embodiments of this disclosure.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

Figure 1:
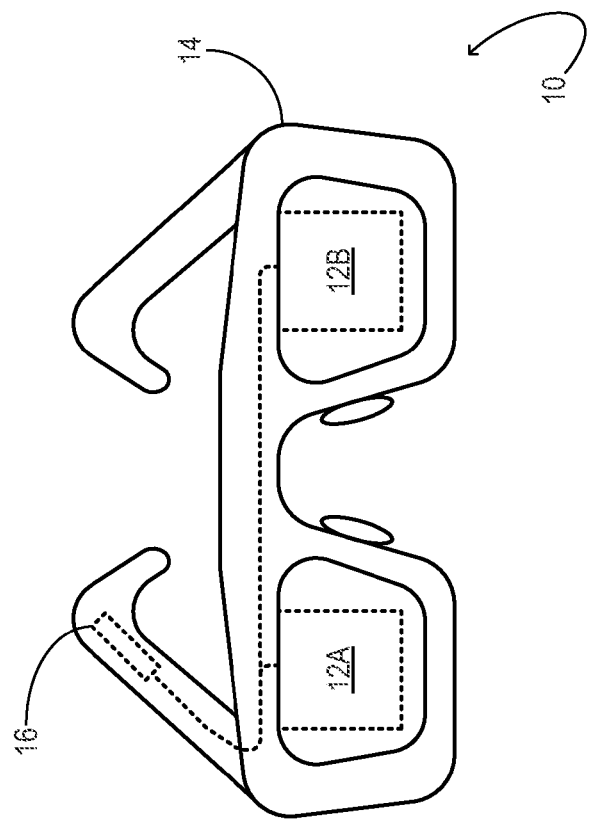

FIG. 1 shows a head-mounted display system 10 in one embodiment. System 10 is an example of video-display eyewear. It may closely resemble an ordinary pair of eyeglasses or sunglasses. However, this system includes see-through display devices 12A and 12B, which project display images for view by the wearer. In particular, the display images are projected directly in front of the wearer's eyes. Accordingly, system 10 includes wearable mount 14, which positions the display devices a short distance in front of the wearer's eyes. In FIG. 1, the wearable mount takes the form of conventional eyeglass frames.

Display devices 12A and 12B are at least partly transparent, so that the wearer can view an external scene as well as a display image. In one scenario, the display image and various subjects in the external scene may occupy different focal planes, such that wearer may shift his or her focus from the external subjects to the display image and vice versa. In other scenarios, the display image and at least one external subject may share the same focal plane, as described hereinafter.

Continuing in FIG. 1, system 10 includes controller 16, which controls the internal componentry of display devices 12A and 12B in order to form the display images and enable the viewing of the external scene. In one embodiment, controller 16 may cause display devices 12A and 12B to project the same display image concurrently, so that the wearer's right and left eyes receive the same image at the same time. In another embodiment, the display devices may project slightly different images concurrently, so that the wearer perceives a stereoscopic, i.e., three-dimensional image. FIG. 2 shows another example head-mounted display system 18. System 18 is a helmet having a visor 20, behind which display devices 12A and 12B are arranged. System 18 may be used in applications ranging from video gaming to aviation.

Figure 3:
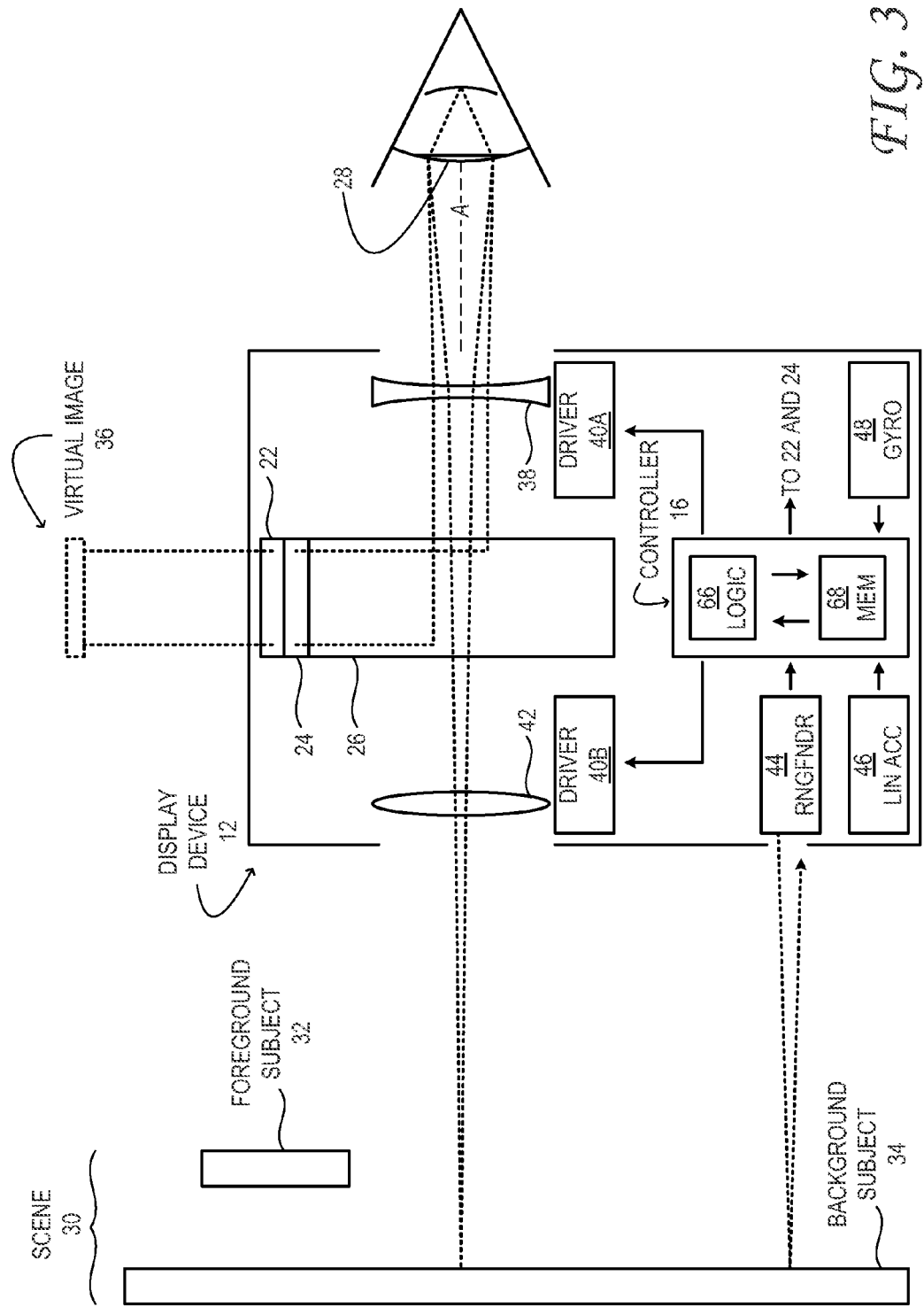
FIG. 3 shows an example environment for overlaying first and second images in a common focal plane of a viewer in accordance with an embodiment of this disclosure.

FIG. 3 shows aspects of an example see-through display device 12 in one embodiment. The display device includes illuminator 22 and image former 24. In one embodiment, the illuminator may comprise a white-light source, such as a white light-emitting diode (LED). The illuminator may further comprise suitable optics for collimating the emission of the white-light source and directing the emission to the image former. The image former may comprise a rectangular array of light valves, such as a liquid-crystal display (LCD) array. The light valves of the array may be arranged to spatially vary and temporally modulate the amount of collimated light transmitted therethrough, such as to form pixels of the display image. Further, the image former may comprise suitable light-filtering elements in registry with the light valves, so that a color display image may be formed.

In another embodiment, the illuminator may comprise one or more modulated lasers, and the image former may be configured to raster the emission of the lasers in synchronicity with the modulation to form the display image. In yet another embodiment, image former 24 may comprise a rectangular array of modulated color LED's arranged to form the display image. As the color LED array emits its own light, illuminator 16 may be omitted from the display device.

In the embodiments considered above, image former 24 (and illuminator 22 when present) is operatively coupled to controller 16. The controller provides suitable control signals that, when received by the image former, cause the desired display image to be formed. The controller may be further configured to execute any control or processing action described herein, and other actions as well. Some functional components of controller 16 are described hereinafter.

Continuing in FIG. 3, image former 24 is arranged to project the display image into see-through multipath optic 26. The multipath optic is configured to reflect the display image to pupil 28 of a viewer—viz., the wearer of the head-mounted display system in which the display device is installed. The multipath optic is also configured to transmit to the viewer's pupil an external image of scene 30, arranged external to the display device and opposite the viewer. In this manner, the multipath optic may be configured to guide both the display image and the external image along the same axis A to the pupil. Scene 30, as shown in FIG. 3, may include one or more stationary or moving foreground subjects 32. The foreground subjects are arranged in front of a background subject 34—i.e., between the background subject and the display device.

To reflect the display image as well transmit the external image to pupil 28, multipath optic 26 may comprise a partly reflective, partly transmissive structure, as found in an optical beam splitter. In one embodiment, the multipath optic may comprise a partially silvered mirror. In another embodiment, the multipath optic may comprise a refractive structure that supports a thin turning film.

In one embodiment, a refractive structure within multipath optic 26 may be configured with optical power. It could be used to guide the display image to pupil 28 at a controlled vergence, such that the display image is provided as a virtual image in a focal plane different from the plane of image former 24. In other embodiments, the multipath optic may contribute no optical power, and a virtual display image may be formed via the diverging and/or converging power of other optical elements, as described below. In FIG. 3, an apparent position of a virtual display image is shown, by example, at 36.

In one embodiment, the combined optical power of illuminator 22, image former 24, and multipath optic 26 may be such as to project a virtual display image focused 'at infinity'. This configuration, absent further converging or diverging optics, may provide a positive see-through display experience when the scene viewed through the display device has a relatively large depth of field. It may provide a less positive experience, however, when the depth of field is shallow. At issue here is the way that the human brain controls the focus of the eye. In sum, the brain is antagonistic to plural background subjects in a scene. Instead of establishing a different focus for background subjects arranged at different depths, the brain will try to use a common focus for all background imagery. Thus, if the wearer of a head-mounted display system is viewing a virtual display image focused at infinity, and facing a wall five meters away, the display image would appear to float in front of the wall; the wall and the display image would both be resolved without a change in focus of the wearer's eye. If the wearer then places a hand in front of his or her face, resolving the hand would induce a change in focus, and when the hand is in focus, the wall and the virtual display image would appear blurred.

However, the brain's attempt to align background imagery is limited by the eye's finite depth of field. If the viewer in the present example moves closer to the wall—e.g., to thirty centimeters—it will be impossible for the same corneal focus to sharply image both the wall and a virtual display image projected at infinity. Continued attempts to do so may cause the viewer to experience eyestrain and headache.

In view of these issues, display device 12 of FIG. 3 is configured to project a virtual display image at an adjustable (i.e., movable) focal plane. The focal plane is adjusted dynamically in response to the distance to background subject 34, and to other factors. Accordingly, display device 12 includes adaptive diverging lens 38 and diverging lens driver 40A. The adaptive diverging lens is one example of an adaptive diverging optic having adjustable optical power. It is arranged between the multipath optic and the viewer's pupil, and is configured to adjustably diverge the display image and the external image such that the display image is brought into focus at a target focal plane. The diverging lens driver is operatively coupled to the adaptive diverging lens and configured to adjust the optical power of the lens. It is configured to control the focal length of the adaptive diverging lens in response to a control signal from controller 16. In this manner, the focal plane of the virtual display image can be moved back and forth—e.g., from infinity to a finite depth. The controller, meanwhile, receives one or more forms of input that enable it to determine the desired target position of the focal plane, as discussed further below.

In one embodiment, the focal length of adaptive diverging lens 38 may be varied so as to move the focal plane of the virtual display image between infinity and thirty centimeters at suitably fine intervals—e.g., continuously or at fixed increments. In some embodiments, the increments may be arranged linearly in reciprocal space. There may be four, five, ten, or one-hundred increments, for example. In one embodiment, the increments may be arranged in one-half diopter steps. In one embodiment, the adaptive diverging lens may have a maximum optical power of −4 diopters, for a focal length of 25 centimeters (cm). In another embodiment, the adaptive diverging lens may comprise a compound stack of diverging lenses, wherein at least one lens has changeable optical power.

Because adaptive diverging lens 38 is located directly in front of the viewer's eye, because it has optical power, and because its optical power is subject to change, this lens is liable to defocus the external image of scene 30 transmitted therethrough. Accordingly, display device 12 also includes adaptive converging lens 42 and converging lens driver 40B. The adaptive converging lens is one example of an adaptive converging optic having adjustable optical power. It is arranged at an opposite side of multipath optic 26, relative to the adaptive diverging lens, and is configured to adjustably converge the external image to bring the external image into focus at the target focal plane. The converging lens driver is operatively coupled to the adaptive converging lens and is configured to adjust the optical power of the lens. It is configured to control the focal length of the adaptive converging lens in response to a control signal from controller 16. In one embodiment, the focal length of the adaptive converging lens may be adjusted so that the vergence brought about by the adaptive diverging lens is exactly reversed by the adaptive converging lens, resulting in no optical power being applied to the external image of scene 30. In one embodiment, the focal lengths of the diverging and converging lenses may be adjusted in sympathy: when one increases (i.e., becomes more positive), the other decreases (i.e., becomes more negative). In one embodiment, the increase and the decrease may be of the same amount. In another embodiment, they may differ to compensate for possible non-idealities. In these and other embodiments, such adjustment may also be done in concert—that is to say, with little or no lag between adjustment of the adaptive diverging lens and adjustment of the adaptive converging lens. For example, the adjustment may be enacted in a push-pull manner.

In another embodiment, the focal length of adaptive converging lens 42 may be adjusted in concert with that of adaptive diverging lens 38 so that a constant optical power is applied to the external image of the scene. This approach may be used to provide a see-through display experience while also correcting for the viewer's myopia, hyperopia and/or presbyopia, as discussed below.

In one embodiment, adaptive diverging lens 38 and adaptive converging lens 42 may each comprise one or more electro-optically tunable elements. Such elements may comprise a material phase having a refractive index that changes in response to an applied electric field. In this manner, the optical power (i.e., the focal length) of the lenses may be varied, controllably, by varying the applied electric field. Because the refractive index of the material phase responds rapidly to the changing electric field, the adaptive lenses may be configured to respond rapidly on the timescale of focal-point accommodation of the human eye—in 75 to 100 milliseconds, for example. This is an advantage over mechanically actuated adaptive lens systems, where the response times may be much greater. In the embodiments considered herein, the rapid response times of the adaptive lenses enable prompt movement of the common focal plane of the display and external images. Furthermore, they enable the adaptive converging lens to accurately 'track' the changing optical power of the adaptive diverging lens, such that the external image is in focus whenever the display image is in focus.

Adaptive diverging and converging lenses based on electro-optically tunable elements provide other advantages besides rapid response. For example, such lenses may be configured to operate on two- to five-volt control signals from drivers 40A and 40B, for compatibility with common logic-device families. In addition, each electro-optically tunable element may be a thin, light-weight layer having a transparency of about 97 percent in the visible. Accordingly, a stack comprising three such elements could maintain a transparency of 91 percent, and a thickness no greater than 1.5 millimeters. In some embodiments, multipath optic 26 may be optically coupled (e.g., index matched) to adaptive diverging lens 38 and/or adaptive converging lens 42, for reducing attenuation of the display and/or images. In other embodiments, one or more of the multipath optic, the adaptive diverging lens, and the adaptive converging lens may support an anti-reflective coating to reduce optical losses.

Despite these advantages, it will be understood that no aspect of the foregoing description is intended to be limiting, for numerous variants are contemplated as well. For example, an adaptive reflective element, such as a mirror, or a combination of refractive and reflective elements may suitably embody the adaptive diverging and converging optics disclosed herein.

As noted above, controller 16 receives input that enables it to determine the desired position of the target focal plane. Accordingly, FIG. 3 shows rangefinder 44. Coupled at the front face of display device 12, opposite scene 30, the rangefinder may be any device responsive to the distance between itself and background subject 34 of the scene. To this end, the rangefinder may be configured to measure the time period between emitting a pulse and detecting an 'echo'— i.e., reflected or return pulse. The pulse may be sonic or ultrasonic pulse, or a light pulse. In other embodiments, the rangefinder may acquire an image of the scene illuminated by patterned light. Based on the metrics of the patterned light reflected back to the rangefinder, the distance to the background may be triangulated.

While FIG. 3 shows rangefinder 44 coupled to the front face of display device 12, opposite scene 30, differently configured rangefinders may be located elsewhere. For example, the rangefinder may use a technology in which distance to the background is correlated to the angle of intersection between the optical axes of the viewers eyes—e.g., as defined by the orientation of the pupils. A rangefinder operating on this principle may be arranged the other side of the display device, opposite the viewer's eyes, so that the orientation of each pupil can be sighted.

In these and other embodiments, controller 16 may set the target focal plane of the virtual display image to the distance reported by the rangefinder. Accordingly, the depth of the common focal plane of the virtual display image and the external image may be determined based on an output of the rangefinder. It will be understood, however, that other embodiments equally embraced by this disclosure may not include a rangefinder. Rather, controller 16 may be configured to set the focal plane of the display image based on some other criterion, such as an external input from a computer system or application. In other embodiments, even when a rangefinder is included, the external input may be used to set the focal plane of the display image in a manner that supersedes the rangefinder output. In another embodiment, the rangefinder output may be modified, such that the display image is moved backward or forward based on the external input. In still other embodiments, further processing may be applied in cases where the external input dictates one focal plane, and the rangefinder output dictates another. Such processing may determine a 'compromise' focal plane or establish a priority for resolving the conflicting inputs.

Continuing in FIG. 3, display device 12 includes linear accelerometer 46 and gyroscopic sensor 48. Coupled anywhere within the head-mounted display system in which the display device is installed, these sensors furnish signals responsive to the viewer's head motion to controller 16. In one embodiment, the controller may determine the appropriate focal plane of the virtual display image based partly on the viewer's head motion, as reported by the sensors. For example, the linear accelerometer may detect when the viewer's head has tilted away from the optical axis of display device 12, indicating that a focal correction of the display image and/or the external image may be desired. Likewise, the gyroscopic sensor may be used to detect a rotation of the viewer's head, suggestive of a change in focus.

The configurations described above enable various methods for overlaying first and second images in a common focal plane of a viewer. Accordingly, some such methods are now described, by way of example, with continued reference to the above configurations. It will be understood, however, that the methods here described, and others fully within the scope of this disclosure, may be enabled by other configurations as well. Naturally, some of the process steps described and/or illustrated herein may, in some embodiments, be omitted without departing from the scope of this disclosure. Likewise, the illustrated sequence of the process steps may not always be required to achieve the intended results, but is provided for ease of illustration and description. One or more of the indicated actions, functions, or operations may be performed repeatedly, depending on the particular strategy being used.

Figure 4:
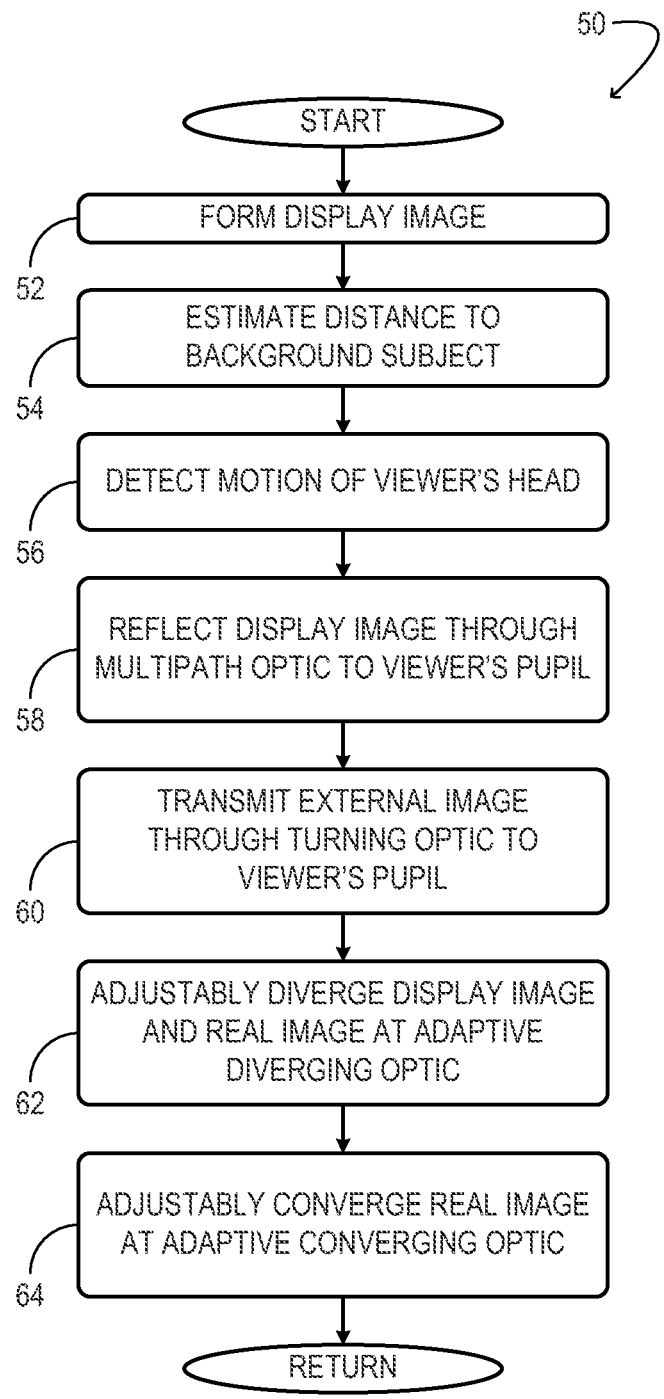
FIG. 4 illustrates an example method for overlaying first and second images in a common focal plane of a viewer in accordance with an embodiment of this disclosure.

FIG. 4 illustrates an example method 50 for overlaying first and second images in a common focal plane of a viewer. In this embodiment, the viewer is a wearer of a head-mounted display system. The first image is a display image formed in the head-mounted display system, and the second image is an external image of a scene arranged opposite the viewer. The external image may include one or more foreground subjects arranged in front of a background subject.

At 52 of method 50, the display image is formed in the head-mounted display system. As described hereinabove, the display image may be formed in any suitable image former coupled in the display system. In forming the display image, the image former may project the display image into an infinitely distant focal plane arranged normal to the natural optical axis of the viewer, as defined by the viewer's pupil and retina.

At 54 the distance to a background subject of the scene is estimated. In one embodiment, estimating the distance to the background subject comprises detecting a sonic, ultrasonic, or optical reflection from the background subject, as described above. In another embodiment, estimating the distance to the background subject comprises detecting an orientation of the viewer's pupil or pupils—e.g., measuring the angle of convergence of the viewer's eyes.

In the embodiments considered herein, the estimated distance to the background subject is data that may be received by a controller and used in various ways. For example, it may control or inform the selection of the common focal plane for the display image and the external image, as discussed below. In some embodiments, this data may also be used to control the manner in which the display image is formed—e.g., at 52 above. It is known, for example, that the left and right eyes align along parallel optical axes only when viewing a subject 'at infinity'. However, as the subject and the viewer approach each other, the optical axes of the left and right eyes converge to intersect at the subject. Accordingly, if the display image is to be viewed comfortably in the same focal plane as the subject, then the display image for the left eye may be shifted to the right, and the display image for the right eye may be shifted to the left, as the subject and the viewer approach each other. In one embodiment, such shifting may be enacted by controller 16, according to the controlling geometric and ocular principles.

Continuing in FIG. 4, at 56 a motion of viewer's head is detected. In one embodiment, the detected motion may include linear acceleration, as detected via a linear accelerometer. In another embodiment, the detected motion may include rotation, as detected by a gyroscopic sensor. Accordingly, any rotation or inclination of the viewer's head may be detected.

At 58 the display image is reflected and guided through a multipath optic to the viewer's pupil. In one embodiment, as illustrated in FIG. 3, the display image may be guided from an image former to the viewer's pupil through a ninety-degree reflection at the multipath optic. At 60 the external image is transmitted and guided through the multipath optic to viewer's pupil. With further reference to FIG. 3, the external image may be guided directly through the multipath optic to the viewer's pupil. Accordingly, both the display image and the external are guided from the multipath optic to the viewer's pupil along the same optical axis, as defined by the viewer's pupil and retina.

At 62 the display image, together with the external image, is adjustably diverged at an adaptive diverging optic of the display system. The level of divergence applied to these images may be such as to move the display image from the infinitely distant focal plane in which it was projected to a target focal depth. In one embodiment, the target focal depth to which the display image is moved may correspond to a distance between the viewer and a background subject of the external scene. In this manner, the display image may be brought into focus at the common focal plane referred to above.

At 64 the external image is adjustably converged at an adaptive converging optic to bring the second image into focus at the common focal plane. In 62 and 64, the adaptive diverging and converging optics may be actuated in concert, such that the display image and the external image are brought into focus concurrently. Further, the adaptive diverging and converging optics may be actuated in sympathy, such that a vergence of the external image caused by adjustably diverging the display image and the external image is reversed by adjustably converging the external image.

In one embodiment, the divergence imparted to the external image at 62 may be fully reversed at 64, so that no net vergence is applied to the external image. In other embodiments, the vergence may be reversed incompletely to correct a ocular defect of the viewer—myopia, hyperopia, presbyopia, etc.—which may affect the viewer's resolution of the external image. Accordingly, the actions of 62 and 64 may result in a net vergence being applied to the external image, of an amount suitable to enable the viewer to resolve the external image despite his or her ocular defect.

In embodiments that include correction for ocular defects of the viewer, various actions may be taken to determine the appropriate level of correction. In one embodiment, an interface of the head-mounted display system may query the viewer to specify the level of the correction. In another embodiment, the system may enact a more automatic procedure, wherein the controller progressively varies the level of correction from a myopic limit to a hyperopic limit. The viewer may signal the point at which the level of correction is adequate by tapping the lenses, or in any other suitable manner. From 64 the method returns.

As noted above, the methods and functions described herein may be enacted via controller 16, shown schematically in FIG. 3. The controller includes logic subsystem 66 and memory subsystem 68. Through operative coupling of the logic subsystem and the memory subsystem, the controller may be configured to enact any method—i.e., computation, processing, or control function—described herein.

More specifically, memory subsystem 68 may hold instructions that cause logic subsystem 66 to enact the various methods. To this end, the logic subsystem may include one or more physical devices configured to execute instructions. For example, the logic subsystem may be configured to execute instructions that are part of one or more programs, routines, subjects, components, data structures, or other logical constructs. Such instructions may be implemented to perform a task, implement a data type, transform the state of one or more devices, or otherwise arrive at a desired result. The logic subsystem may include one or more processors configured to execute software instructions. Additionally or alternatively, the logic subsystem may include one or more hardware or firmware logic machines configured to execute hardware or firmware instructions. The logic subsystem may optionally include components distributed among two or more devices, which may be remotely located in some embodiments.

Memory subsystem 68 may include one or more physical, non-transitory, devices configured to hold data and/or instructions executable by logic subsystem 66 to implement the methods and functions described herein. When such methods and functions are implemented, the state of the memory subsystem may be transformed (e.g., to hold different data). The memory subsystem may include removable media and/or built-in devices. The memory subsystem may include optical memory devices, semiconductor memory devices, and/or magnetic memory devices, among others. The memory subsystem may include devices with one or more of the following characteristics: volatile, nonvolatile, dynamic, static, read/write, read-only, random access, sequential access, location addressable, file addressable, and content addressable. In one embodiment, the logic subsystem and the memory subsystem may be integrated into one or more common devices, such as an application-specific integrated circuit (ASIC) or so-called system-on-a-chip. In another embodiment, the memory subsystem may include computer-system readable removable media, which may be used to store and/or transfer data and/or instructions executable to implement the herein-described methods and processes. Examples of such removable media include CD's, DVD's, HD-DVD's, Blu-Ray Discs, EEPROMs, and/or floppy disks, among others.

In contrast, in some embodiments aspects of the instructions described herein may be propagated in a transitory fashion by a pure signal—e.g., an electromagnetic signal, an optical signal, etc.—that is not held by a physical device for at least a finite duration. Furthermore, data and/or other forms of information pertaining to the present disclosure may be propagated by a pure signal.

The terms 'module' and/or 'engine' are used to describe an aspect of controller 16 that is implemented to perform one or more particular functions. In some cases, such a module or engine may be instantiated via logic subsystem 66 executing instructions held by memory subsystem 68. It will be understood that different modules and/or engines may be instantiated from the same application, code block, subject, routine, and/or function. Likewise, the same module and/or engine may be instantiated by different applications, code blocks, subjects, routines, and/or functions in some cases.

As shown in FIG. 3, controller 16 may include various input devices and various output devices, such as display 12. Display 12 may provide a visual representation of data held by memory subsystem 68. As the herein-described methods and processes change the data held by the memory subsystem, and thus transform the state of the memory subsystem, the state of the display may likewise be transformed to visually represent changes in the underlying data. The display may include one or more display devices utilizing virtually any type of technology. Such display devices may be combined with logic subsystem 66 and/or memory subsystem 68 in a shared enclosure, or such display devices may be peripheral display devices.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. In a see-through display system having an electronically controlled adaptive diverging optic and an electronically controlled adaptive converging optic, a method to present a display image and an external image to a viewer, wherein the external image is an image of a scene opposite the viewer and includes a background subject, the method comprising:
    forming the display image by an image former, wherein the image former is disposed between the adaptive converging optic and the adaptive diverging optic;
    guiding the display image and the external image along an axis that passes through the adaptive diverging optic and leads to a pupil of the viewer;
    determining a distance to the background subject;
    receiving data responsive to the distance to the background subject;
    calculating a target focal plane for the display image based on the data responsive to the distance to the background subject;
    adjustably converging the external image at the adaptive converging optic; and
    adjustably diverging the display image and the external image at the adaptive diverging optic to bring the display image into focus at the target focal plane.

2. The method of claim 1, wherein the display system is a head-mounted display system, and wherein forming the display image includes projecting the display image onto an infinitely distant focal plane.

3. The method of claim 2, wherein adjustably diverging the display image and the external image includes moving the display image from the infinitely distant focal plane to the target focal plane.

4. The method of claim 3, wherein the target focal plane is between the viewer and the background subject of a scene opposite the viewer.

5. The method of claim 1, further comprising one or more of detecting a reflection from the background subject, detecting an orientation of the pupil of the viewer, and detecting a head inclination of the viewer.

6. The method of claim 1, wherein the adaptive diverging optic and the adaptive converging optic are actuated in concert, such that the display image and the external image are focused concurrently.

7. The method of claim 1, wherein the adaptive diverging optic and the adaptive converging optic are actuated in sympathy, such that a vergence of the external image from adjustably converging the external image is reversed by adjustably diverging the display image and the external image.

8. The method of claim 7, wherein the vergence is reversed incompletely, to enable the viewer to resolve the external image despite his or her ocular defect.

9. A see-through display system for presenting a display image and an external image to a viewer, wherein the external image is an image of a scene opposite the viewer and includes a background subject, the system comprising:
    a multipath optic configured to guide the display image and the external image along an axis that leads to a pupil of the viewer;
    an adaptive diverging optic with adjustable optical power arranged between the multipath optic and the pupil, the adaptive diverging optic configured to adjustably diverge the display image and the external image;
    an adaptive converging optic with adjustable optical power arranged in front of the multipath optic to adjustably converge the external image;
    an image former configured to form the display image, wherein the image former is disposed between the adaptive converging optic and the adaptive diverging optic;
    a rangefinder that determines a distance to the background subject; and
    a controller configured to electronically adjust the optical power of the adaptive diverging optic so that the display image is brought into focus at a target focal plane that is positioned based on an output of the rangefinder that is responsive to the distance to the background subject, and to electronically adjust the optical power of the adaptive converging optic to reverse a vergence change of the external image caused by the adaptive diverging optic.

10. The system of claim 9 further comprising an image former configured to project the display image into the multipath optic.

11. The system of claim 9, wherein each of the adaptive diverging optic and the adaptive converging optic includes an electro-optically tunable lens.

12. The system of claim 9, wherein each of the adaptive diverging optic and the adaptive converging optic is operatively coupled to a driver configured to vary the optical power of that optic, and wherein the controller is operatively coupled to each driver.

13. The system of claim 9, wherein the rangefinder comprises componentry that detects a reflection from the background subject.

14. The system of claim 9, wherein the rangefinder comprises componentry that detects an orientation of a pupil of the viewer.

15. The system of claim 9 further comprising one or more of a linear accelerometer and gyroscopic sensor configured to detect a head motion of the viewer, wherein the target focal plane is positioned based on the head motion.

16. A method for presenting a display image and an external image to a viewer, wherein the external image is an image of a scene opposite the viewer and includes a background subject and the external image is viewed though a head-mounted display system worn by the viewer, the method comprising:

forming the display image in an image former of the head-mounted display system;

reflecting the display image through a multipath optic and along an axis that leads to a pupil of the viewer;

transmitting the external image through the multipath optic and along the axis, toward the pupil;

determining a distance to the background subject;

receiving data responsive to the distance to the background subject;

calculating a target focal plane for the display image based on the data responsive to the distance to the background subject; and concertedly converging the external image at a converging electro-optically tuned lens and diverging both the display image and the external image at a diverging electro-optically tuned lens to bring the display image into focus at the target focal plane, wherein the image former is disposed between the converging electro-optically tuned lens and the diverging electro-optically tuned lens.

17. The method of claim 16, wherein the target focal plane is a focal plane of the external image.

\* \* \* \* \*